(12) United States Patent
Wagner

(10) Patent No.: US 7,034,197 B2
(45) Date of Patent: Apr. 25, 2006

(54) METAL ALLOY AND METAL ALLOY STORAGE PRODUCT FOR STORING RADIOACTIVE MATERIALS

(75) Inventor: Anthony S. Wagner, Bee Caves, TX (US)

(73) Assignee: Clean Technologies International Corporation, Lakeway, TX (US)

( * ) Notice: Subject to any disclaimer, the term of this patent is extended or adjusted under 35 U.S.C. 154(b) by 268 days.

(21) Appl. No.: 10/059,808

(22) Filed: Jan. 29, 2002

(65) Prior Publication Data

US 2002/0173687 A1 Nov. 21, 2002

Related U.S. Application Data

(63) Continuation-in-part of application No. 09/334,985, filed on Jun. 17, 1999, now Pat. No. 6,355,857, which is a continuation-in-part of application No. 09/096,617, filed on Jun. 12, 1998, now abandoned, and a continuation-in-part of application No. 09/274,583, filed on Mar. 23, 1999, now Pat. No. 6,195,382.

(51) Int. Cl.
*G21F 9/00* (2006.01)

(52) U.S. Cl. .................. 588/15; 588/1; 588/2; 588/18; 588/201; 588/901; 420/552

(58) Field of Classification Search ............. 588/1, 588/2, 15, 18, 201, 249, 252, 901; 252/625; 420/529, 552, 554; 376/272
See application file for complete search history.

(56) References Cited

U.S. PATENT DOCUMENTS

| | | | |
|---|---|---|---|
| 4,204,975 A | * | 5/1980 | Thiele ..................... 588/15 |
| 4,263,163 A | | 4/1981 | Ross |
| 4,300,056 A | | 11/1981 | Gagneraud |
| 4,338,215 A | * | 7/1982 | Shaffer et al. ............ 588/15 |
| 4,571,307 A | | 2/1986 | Bonniaud et al. |
| 5,000,101 A | * | 3/1991 | Wagner ................ 110/346 |
| 5,592,027 A | | 1/1997 | Jacq et al. |
| 5,640,702 A | | 6/1997 | Shultz |
| 5,678,236 A | | 10/1997 | Macedo et al. |
| 5,814,824 A | | 9/1998 | Hamby et al. |
| 6,195,382 B1 | | 2/2001 | Wagner |
| 6,355,857 B1 | | 3/2002 | Wagner |

FOREIGN PATENT DOCUMENTS

| | | | |
|---|---|---|---|
| GB | 1446016 | | 8/1976 |
| JP | 54130798 A | * | 10/1979 |

* cited by examiner

*Primary Examiner*—Stuart L. Hendrickson
*Assistant Examiner*—Peter J Lish
(74) *Attorney, Agent, or Firm*—Russell D. Culbertson; The Culbertson Group, P.C.

(57) ABSTRACT

A liquid reactant metal alloy includes at least one chemically active metal for reacting with non-radioactive material in a mixed waste stream being treated. The reactant alloy also includes at least one radiation absorbing metal. Radioactive isotopes in the waste stream alloy with, or disperse in, the chemically active and radiation absorbing metals such that the radiation absorbing metals are able to absorb a significant portion of the radioactive emissions associated with the isotopes. Non-radioactive constituents in the waste material are broken down into harmless and useful constituents, leaving the alloyed radioactive isotopes in the liquid reactant alloy. The reactant alloy may then be cooled to form one or more ingots in which the radioactive isotopes are effectively isolated and surrounded by the radiation absorbing metals. These ingots comprise the storage products for the radioactive isotopes. The ingots may be encapsulated in one or more layers of radiation absorbing material and then stored.

9 Claims, 2 Drawing Sheets

METAL ALLOY AND METAL ALLOY STORAGE PRODUCT FOR STORING RADIOACTIVE MATERIALS

CROSS REFERENCE TO RELATED APPLICATIONS

This application is a continuation-in-part of U.S. patent application Ser. No. 09/334,985, filed Jun. 17, 1999 now U.S. Pat. No. 6,355,857, and entitled "REACTANT METAL ALLOY TREATMENT PROCESS FOR RADIOACTIVE WASTE(as amended)," which is a continuation-in-part of U.S. patent application Ser. No. 09/096,617, filed Jun. 12, 1998 now abandoned, entitled "REACTANT METAL ALLOY TREATMENT PROCESS AND STORAGE PRODUCT FOR RADIOACTIVE WASTE," and also U.S. patent application Ser. No. 09/274,583, filed Mar. 23, 1999 now U.S. Pat. No. 6,195,382, entitled "HIGH TEMPERATURE MOLTEN METAL REACTOR AND WASTE TREATMENT PROCESS." The benefit of each of these earlier related applications is hereby claimed under 35 U.S.C. §120. The disclosure of each of these related applications is incorporated herein by this reference.

TECHNICAL FIELD OF THE INVENTION

This invention relates to liquid metal alloys for use in waste treatment processes and to waste storage products produced using liquid metal alloys. More particularly, the invention relates to liquid metal alloys for treating waste streams that include radioactive isotopes. The invention also encompasses a metal alloy storage product for use in storing radioactive isotopes.

BACKGROUND OF THE INVENTION

Many waste treatment processes utilize thermal energy to break up waste materials into their constituent elements or more desirable compounds. The use of thermal energy to break down materials is referred to generally as pyrolization. Molten or liquid phase metals have also been used to react with certain waste materials in order to produce more desirable compounds or reduce the waste to constituent elements. In particular, liquid aluminum has been used to react with halogenated hydrocarbons and produce aluminum salts. U.S. Pat. No. 4,469,661 to Shultz described the destruction of PCBs and other halogenated hydrocarbons by contacting the hydrocarbon vapor with liquid aluminum. The aluminum was contained in low-boiling eutectic mixtures of aluminum and zinc or aluminum, zinc, and magnesium. Shultz also suggested eutectic reactant mixtures containing iron, calcium, and other metals. U.S. Pat. No. 5,640,702 to Shultz disclosed a liquid metal treatment for wastes containing radioactive constituents. This patent to Shultz disclosed using lead in the liquid reactant metal as a chemically active material for reacting with non-radioactive constituents in the waste to be treated.

U.S. Pat. No. 5,000,101 to Wagner disclosed a process for treating hazardous waste material with liquid alkaline metal alloys. The liquid metal alloy comprised approximately 50% aluminum, 5% to 15% calcium, 5% to 15% copper, 5% to 15% iron, and 5% to 15% zinc. U.S. Pat. No. 5,167,919 to Wagner disclosed a reactant alkaline metal alloy composition comprising between 40% to 95% aluminum, 1% to 25% iron, 1% to 25% calcium, 1% to 25% copper, and 1% to 25% zinc. The '919 Wagner patent also disclosed that magnesium could be substituted for calcium. In both of these Wagner patents, the waste material was reacted in the liquid alloy held at about 800 degrees Celsius.

In the process disclosed in the above-described Wagner patents, chlorine atoms in the waste material were stripped from the waste compound primarily by the highly reactive aluminum in the liquid reactant alloy. The aluminum and chlorine combined to form aluminum chloride. Carbon from the original waste compound was liberated either in elemental form or as char ($CH$, $CH_2$, or $CH_3$). Both the aluminum chloride and liberated elemental carbon sublimed to a gaseous state at the 800 degree Celsius. reaction temperature and were drawn off and separated.

Many hazardous waste sites have different types of wastes mixed together. The mixed waste may include numerous different types of halogenated hydrocarbons, other non-radioactive wastes, and radioactive isotopes. These mixed wastes which include radioactive and non-radioactive materials have proven particularly difficult to treat. Although, many non-radioactive wastes may be treated chemically and broken down into benign or less hazardous chemicals, radioactive constituents of the mixed waste stream cannot be manipulated to reduce or eliminate their radioactive emissions. It is desirable to separate the radioactive constituents from the other materials in the mixed waste and place the radioactive constituents in an arrangement for safe, long term storage.

Storing radioactive waste poses several problems in itself. For a radioactive isotope which has a long half life, a quantity of the material remains radioactive for many years. Thus, a storage arrangement for this long-lived radioactive waste must be capable of securely holding the waste for a very long period of time. However, radioactive emissions, particularly alpha radiation, can interact with the material of a container intended to store radioactive waste. This interaction can cause the container to degrade relatively quickly, long before the radioactive waste itself has degraded.

SUMMARY OF THE INVENTION

A liquid reactant metal alloy according to the invention includes at least one chemically active metal for reacting with non-radioactive material in a mixed waste stream being treated. The reactant alloy also includes at least one radiation absorbing metal. Radioactive isotopes in the waste stream alloy with, or disperse in, the chemically active and radiation absorbing metals such that the radiation absorbing metals are able to absorb a significant portion of the radioactive emissions associated with the isotopes. Non-radioactive constituents in the waste material are broken down into harmless and useful constituents, leaving the alloyed radioactive isotopes in the liquid reactant alloy. The reactant alloy may then be cooled to form one or more ingots in which the radioactive isotopes are effectively isolated and surrounded by the radiation absorbing metals. These ingots comprise the storage product according to the invention. The ingots may be encapsulated in one or more layers of radiation absorbing material and then stored.

The chemically active metal in the reactant alloy may comprise any metal capable of reacting chemically with one or more non-radioactive constituents in the waste stream. Preferred chemically active metals include magnesium, aluminum, lithium, zinc, calcium, and copper. In the preferred form of the invention, a combination of these metals is included in the reactant alloy. The particular chemically active metal or combination of chemically active metals used in a particular application will depend upon the makeup of the wastes in the waste stream and the reaction products which are desired from the treatment process. The relative amount or fraction of chemically active metal or combination of active metals in the alloy (the "chemically active fraction") is preferably sufficient to both completely react the organic constituents and other reducible materials in the waste stream and help dissolve and disperse the radioactive isotopes in the remaining unreacted alloy. Preferably this chemically active metal fraction in the alloy and resulting storage product is no less than forty percent (40%) by weight of the reactant alloy.

Each radiation absorbing metal included in the reactant alloy is matched with a particular radioactive isotope to be alloyed with, or dissolved in, the metals in the liquid metal bath. That is, for each type of expected radioactive emission associated with a radioactive isotope to be alloyed, a radiation absorbing metal is included in the alloy for absorbing that particular type of emission. A particular radiation absorbing metal for absorbing a particular radioactive emission will be referred to herein as a corresponding radiation absorbing metal for that emission. Similarly, a particular radioactive emission which may be absorbed by a particular radiation absorbing metal will be referred to herein as a corresponding radioactive emission for that radiation absorbing metal. Preferred radiation absorbing metals include particular isotopes of lead, beryllium, cadmium, vanadium, yttrium, ytterbium, zirconium, and tungsten. One or more of these radiation absorbing metals may be used within the scope of the invention depending upon the radioactive isotopes to be added to the liquid metal bath. For purposes of this disclosure and the accompanying claims, a "radiation absorbing metal" comprises a metal which is capable of capturing a particular expected radioactive emission, that is, a particular emission at a natural decay energy level.

As used in this disclosure and the following claims, the "type of expected radioactive emission" associated with an isotope in the waste material to be treated refers to the particular type of both primary and secondary emission (alpha, beta, gamma, or neutron) characteristic of the isotope and any daughter isotope, and the characteristic energy level of each emission. The "expected radioactive emission" refers to each respective emission within each type of emission. For the purposes of this disclosure and the claims, a "primary radioactive emission" comprises the emission or emissions directly from the radioactive decay of an isotope. For most radioactive isotopes, the primary radioactive emissions will include either an alpha or beta emission at a characteristic energy level and a gamma emission at a characteristic energy level. A "secondary radioactive emission," for the purposes of this disclosure, comprises a radioactive emission resulting from a primary radioactive emission. A secondary radioactive emission (commonly gamma radiation or a liberated neutron) is generated as a primary radioactive emission is absorbed by an absorbing material or as a primary radioactive emission otherwise interacts with matter.

Although the invention has particular application in treating mixed waste streams that include both radioactive and non-radioactive wastes, those skilled in the art will appreciate that a waste stream made up of only radioactive materials may be treated using the present process. The metal alloy according to the invention is useful for diluting and alloying or otherwise holding the radioactive isotopes for storage even in the absence of non-radioactive wastes.

Regardless of the particular composition of the reactant alloy according to the invention, the alloy is heated to a liquid state for receiving the waste stream. It is typically desirable to use the lowest reactant alloy temperature necessary to react any non-radioactive constituents in the waste stream and to efficiently melt or dissolve the radioactive material into the alloy. For mixed wastes that include organic constituents, a reactant alloy temperature of at least 770 degrees Celsius is generally required to quickly break the organic molecules down into the desired materials. Higher temperatures may be desirable to better dissolve or melt heavier radioactive isotopes such as transuranic elements.

The reactant alloy according to the invention may be heated using fossil fuel burners. Electrical induction heating systems or any other suitable heating arrangement may also be used to heat the reactant metal alloy to the desired operating temperature. The waste material is introduced directly into the liquid reactant alloy, preferably below the surface of the liquid material.

The aluminum, magnesium, or lithium in the reactant alloy chemically strips chlorine or any other halogen atoms from organic molecules in the waste material to form a metal salt. Some of these metal salts may remain in a liquid state and separate by gravity separation in the reactant alloy container. Other metal salts such as aluminum chloride, for example, along with carbon freed from the waste material in the form of elemental carbon and char go to a gaseous state at the temperature of the liquid alloy. Gas released in the treatment process may be drawn off and scrubbed in an aqueous scrubber/separator to produce a slurry of carbon, char, and salt solution. The salt solution may then be separated and processed to recover the salts, carbon, and char. Each material produced in a reaction with a chemically active metal in the alloy will be referred to in this disclosure as a reaction product.

In order to produce a mechanically stable ingot for long-term storage, the amount of radiation absorbing metal in the reactant alloy is maintained at a particular minimum ratio to the number of radioactive isotopes in the resulting alloy or as a function of the corresponding expected radioactive emissions in the volume of the resulting alloy. The preferred ratio comprises no less than approximately seven hundred and twenty-seven (727) atoms of radiation absorbing metal to the corresponding radioactive emission. This ratio produces an alloy in which radioactive emissions may be absorbed by the radiation absorbing metals without significantly degrading the mechanical integrity of the ingot.

One preferred form of reactant metal alloy according to the invention includes a compact crystal forming metal to help create a compact or close packed crystalline lattice structure in the resulting solidified storage product. A particularly desirable crystalline lattice structure in the resulting product comprises a hexagonal crystalline structure which may be produced with tungsten. The preferred relative amount or fraction of tungsten in the resulting storage product is one tungsten atom for every twenty-seven atoms of other elements in the storage product.

The alloy according to the invention may be adapted for producing a storage product for storing fast neutron emitting isotopes. To store fast neutron emitting isotopes, a reactant alloy should include a transmutation target fraction made up of a transmutation target material for absorbing fast neutrons emitted by the fast neutron emitting isotope. Because the absorption of a fast neutron will result in secondary radioactive emissions, the alloy should also include a transmutation emission absorbing fraction made up of a transmutation emission absorbing material for absorbing emissions resulting from the absorption of a respective fast neutron by the transmutation target material. The preferred close packed crystal structure produced by including tungsten in the alloy is particularly helpful in creating a structure in the resulting storage product for facilitating the absorption of fast neutrons emitted from constituents in the storage product.

One advantage of the treatment process according to the invention is that it combines the separation of radioactive waste from non-radioactive wastes with the chemical treatment of non-radioactive wastes. Also, the ingots which result from the process are very stable. There is very little chance for release of the alloyed or otherwise dispersed radioactive isotopes from the ingots. Furthermore, radioactive emissions from the ingots are reduced by the radiation absorbing metals which are distributed throughout the matrix of the alloy along with the radioactive isotopes. The radiation absorbing metals also serve to prevent the radioactive emissions from adversely affecting the other metals in the ingots and prevent significant mechanical degradation in the alloy material.

These and other advantages and features of the invention will be apparent from the following description of the preferred embodiments, considered along with the accompanying drawings.

DESCRIPTION OF THE PREFERRED EMBODIMENTS

Figure 1:
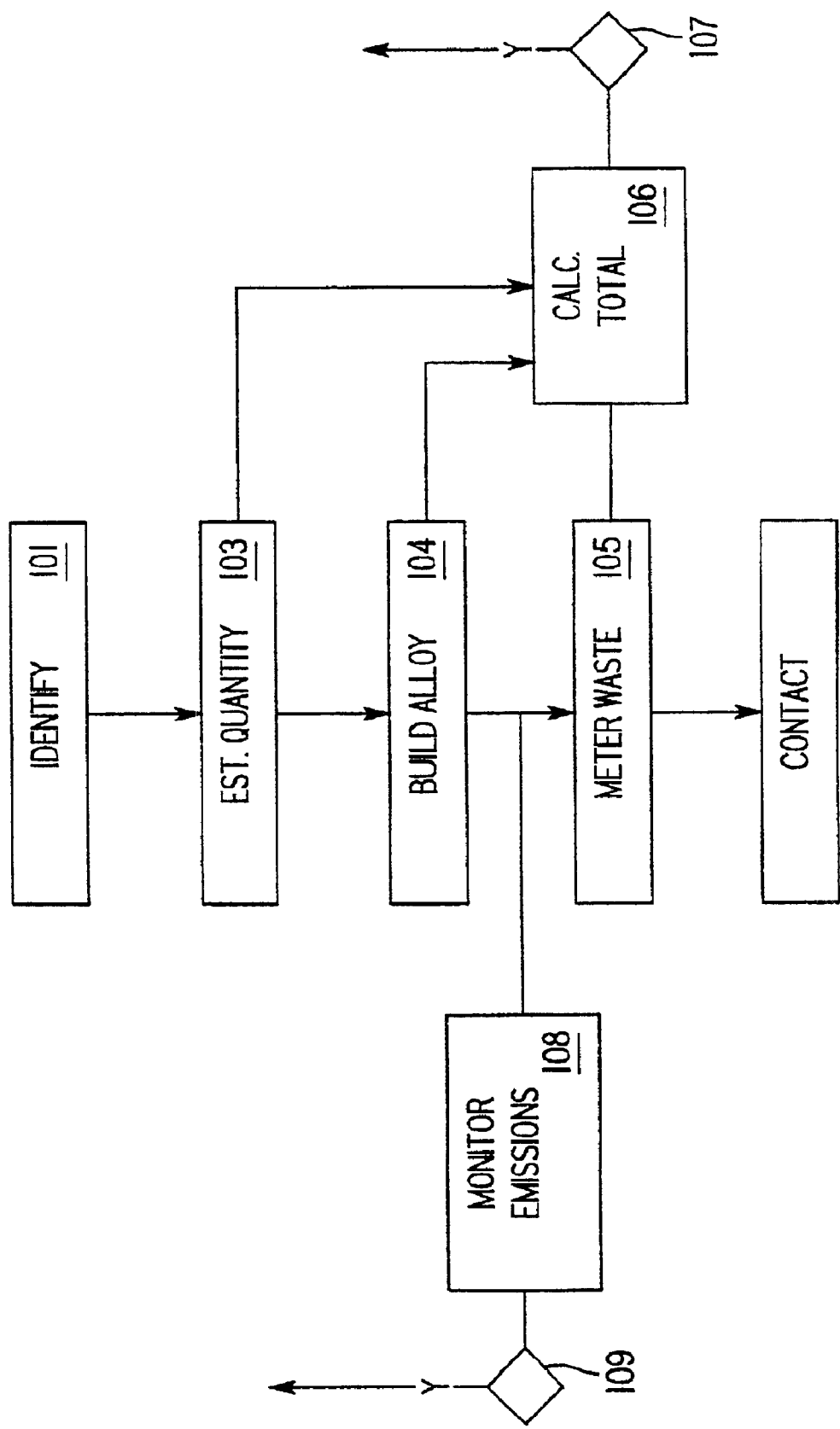
FIG. 1 is a block diagram showing a treatment process utilizing a reactant metal alloy embodying the principles of the invention.

A reactant alkaline metal alloy composition embodying the principles of the invention includes one or more chemically active alkaline metals and one or more radiation absorbing metals. This combination of chemically active metals and radiation absorbing metals is used to treat wastes that include radioactive isotopes and produce a storage product for such radioactive isotopes. The alkaline metals make up a chemically active metal fraction in the alloy and resulting storage product, and are included for chemically reacting with hydrocarbon and other non-radioactive wastes in a waste stream and for facilitating the alloying or dissolution of radioactive isotopes. Radiation absorbing metals generally do not react chemically in any substantial degree with any material in the waste stream and are included in the reactant alloy only for their radiation absorption characteristics. Also, the radiation absorbing metals are matched by their radiation absorption characteristics to radioactive isotopes to be added to the reactant alloy and, more particularly, to the radioactive emissions expected within the resulting alloy.

The chemically active alkaline metal or metals in the reactant alloy may comprise, aluminum, magnesium, lithium, calcium, iron, zinc, and copper. The aluminum, magnesium, and/or lithium in the reactant alloy react with halogenated hydrocarbons, to produce aluminum, magnesium, and/or lithium salts. Calcium, iron, zinc, and copper in the reactant alloy may react with certain non-radioactive constituents in the waste material, but are primarily included as stabilizing agents for the aluminum, magnesium, and/or lithium in the reactant alloy.

The radiation absorbing metal or metals in the reactant alloy may comprise particular isotopes of beryllium, cadmium, vanadium, yttrium, ytterbium, zirconium, tungsten, or lead. Various isotopes of these metals exhibit a low fission neutron cross section which allows them to absorb radioactive emissions to produce either a stable isotope or an isotope which emits only relatively low energy radiation. Table 1 shows a list of preferred radiation absorbing metals which may be employed in the reactant metal alloy within the scope of the invention. Table 1 also lists the particular radioactive emissions which each radiation absorbing metal is capable of absorbing. The particular radiation absorbing metal or metals chosen for an application will depend upon the nature of the radioactive isotopes in the waste stream being treated. Specifically, a radiation absorbing metal is included in the reactant alloy for each corresponding expected radioactive emission. Thus, for each type of expected radioactive emission associated with an isotope added to the alloy, an absorbing metal is included for absorbing that particular type of radioactive emission.

TABLE I

| ELEMENT | ISOTOPE | ABSORPTION CHARACTERISTIC |
| --- | --- | --- |
| LEAD | 197–207 | GAMMA ABSORBER AT .72 MeV AND HIGHER |
|  | 208–214 | BETA ABSORBER |
| TUNGSTEN | 173–183 | GAMMA ABSORBER |
|  | 186–189 | BETA ABSORBER |
|  | 184 | BETA AT .429 MeV |
|  | 185 | GAMMA AT 0.075 MeV |
| VANADIUM | 46 | BETA AT 6.03 MeV AND GAMMA AT .511 MeV |
|  | 47 | BETA AT 1.89 MeV AND GAMMA AT .511 MeV |
|  | 48 | BETA AT .696 MeV AND GAMMA AT .511 MeV |
|  | 50 | GAMMA AT .783 AND 1.55 MeV |
|  | 52–54 | BOTH BETA AND GAMMA AT CERTAIN ENERGY LEVELS |
| YTTRIUM | 82–96 | BETA AT .008–3.06 MeV |
|  | 89 | GAMMA AT .91 MeV |
|  | 90 | GAMMA AT .202 MeV |
|  | 91 | GAMMA AT .551 AND .534 MeV |
|  | 95 | GAMMA AT 1.3 AND 1.8 MeV |
| YTTERBIUM | 154–164 | ALPHA |
|  | 162 | BETA |
|  | 175, 177 | BETA |
|  | 166–169, 171, 176 | GAMMA |
| CADMIUM | 99–124 | BETA ABSORBER, NEUTRONS AT 2,200 M/SEC |
| BERYLLIUM | 8 | ALPHA ABSORBER |
|  | 10–11 | ALPHA AND BETA ABSORBER |
| ZIRCONIUM | ALL | BETA ABSORBER AT 0.38 TO 0.65 MeV |

Those skilled in the art will appreciate that many of the above-identified preferred radiation absorbing metals are themselves unstable isotopes and are subject to radioactive decay. However, the emission energies associated with these isotopes are sufficiently low to avoid substantial radiation leakage from the resulting storage product and mechanical degradation of the storage product.

The alloy produced according to the invention includes sufficient radiation absorbing metal for each corresponding expected emission to maintain a minimum ratio of radiation absorbing metal atoms to the respective corresponding expected radioactive emissions. The preferred ratio is no less than seven hundred and twenty-seven (727) atoms of radiation absorbing metal for each corresponding expected radioactive emission. Higher ratios may also be used within the scope of the invention. Lower ratios may also be used, albeit with an increased risk of radiation leakage from the resulting storage product.

As radioactive isotopes are alloyed into the reactant alloy, the atoms of radioactive material are incorporated into the matrix of the reactant alloy and isolated among the atoms of metals in the reactant alloy. Most importantly, the atoms of radioactive isotopes are substantially distributed and isolated among the atoms of corresponding radiation absorbing metal in the alloy. As used herein to describe the radioactive isotopes added to the liquid metal bath, the term "alloyed" means dissolved or otherwise dispersed and intimately mixed with the liquid reactant metal. This dispersion and resulting isolation of the radioactive isotopes in the reactant alloy matrix among the corresponding radiation absorbing metals at the desired minimum ratio helps ensure that most radioactive emissions from the radioactive isotopes will be captured within the reactant alloy storage product, thereby reducing overall radioactive emissions from the storage product. The specific absorbing metals absorb the radioactive emissions without substantially reducing the mechanical integrity of the storage product.

One preferred reactant metal alloy according to the invention additionally includes a fraction of material for producing a desirable crystalline structure in the storage product. This material comprises a compact crystal forming metal for producing a close packed crystalline structure in the resulting storage product. One preferred close packed crystalline structure comprises a hexagonal structure such as that produced by tungsten. Generally, one atom of tungsten will order 27 other atoms within its close packed hexagonal crystalline structure. The preferred concentration of tungsten in a storage product according to the invention is one atom for every 27 atoms of other metals in the storage product. Six of these groups comprising one tungsten atom and 27 other atoms combine to form a complete crystalline structure. Including less that one tungsten atom for every 27 other atoms in the storage product will result in some of the other atoms in the storage product being excluded from the desired close packed crystalline structure. However, the desired crystalline structure will be present for the 27 atoms ordered for the included tungsten atom. Providing the close packed crystalline structure throughout the resulting storage product has the effect of increasing the likelihood that a particular emission will be absorbed within the storage product. Thus, tungsten is preferably included in the reactant alloy in sufficient quantity to result in this one to twenty-seven ratio in the resulting storage product. The desired crystalline structure may allow fewer radiation absorbing metals to be included in the storage product and still provide effective absorption of emissions within the storage product.

It will be noted that tungsten may also serve as a radiation absorbing metal in the resulting storage product, depending upon the nature of emissions expected in the storage product. The ability to absorb certain radioactive emissions does not diminish or impact the compact crystal forming effect of tungsten in the resulting storage product.

The reactant alloy may include one or more of the following chemically active alkaline metals in the indicated concentration range: between about 1% to 25% zinc, between about 1% to 25% calcium, between about 1% to 25% copper, between about 1% to 25% magnesium, between about 1% to 25% lithium, and between about 10% to 90% aluminum. The reactant alloy may include one or more of the following radiation absorbing metals: lead, tungsten, beryllium, cadmium, vanadium, yttrium, ytterbium, and zirconium. Each of these radiation absorbing metals will commonly be present in the reactant alloy in a concentration range of between about 1% to 25% of the total alloy. All percentages used in this disclosure are by weight of the total reactant alloy. Table 2 sets out nine different preferred reactant alloys tailored for various waste streams.

Each percentage in Table 2 refers to the percentage of a particular radiation absorbing isotope chosen from Table 1. Table 3 indicates the particular applications for which the alloys shown in Table 2 are tailored.

TABLE 2

|           | I  | II | III | IV | V  | VI | VII | VIII | IX |
|-----------|----|----|-----|----|----|----|-----|------|----|
| Zinc      | 3  | 2  | 5   | —  | —  | —  | —   | 3    | —  |
| Calcium   | 2  | 2  | 3   | —  | —  | —  | —   | 2    | —  |
| Copper    | 2  | 2  | 3   | —  | —  | —  | —   | 2    | —  |
| Magnesium | 10 | 3  | —   | —  | —  | —  | —   | 3    | —  |
| Lead      | 42 | —  | —   | 25 | 20 | —  | 25  | 8    | 25 |
| Aluminum  | 41 | 51 | 50  | 50 | 40 | 60 | 50  | 30   | 50 |
| Lithium   | —  | —  | 4   | —  | —  | —  | —   | 10   | —  |
| Beryllium | —  | 40 | —   | 25 | 20 | 15 | —   | 10   | —  |
| Vanadium  | —  | —  | 35  | —  | 20 | 10 | 25  | 10   | 13 |
| Yttrium   | —  | —  | —   | —  | —  | —  | 5   | 10   | —  |
| Zirconium | —  | —  | —   | —  | —  | 10 | —   | 10   | —  |
| Tungsten  | —  | —  | —   | —  | —  | —  | —   | 2    | 12 |

Reactant alloys III, VI, and VII are preferably used at an operating temperature of about 1000 degrees Celsius. Reactant alloy IV is preferably used in the process of the invention at an operating temperature of 850 degrees Celsius., while alloy V is used at an operating temperature of 900 degrees Celsius. The operating temperature for a particular treatment process according to the invention is chosen based both upon the constituents of the waste stream and the reaction products to be produced in the process. Higher operating temperatures may be required to break double and triple carbon bonds and other types of chemical bonds in the molecules of waste material being treated. Higher operating temperatures also generally allow the radioactive constituents in the waste stream to better dissolve or melt into the reactant metal alloy. Also, the operating temperature may be increased to allow certain reaction products to go to a gaseous state and then be removed from the reactant alloy container in the gaseous form.

TABLE 3

Alloy  Waste Stream

I    Dioxins, organic compounds, gamma emitters
II   Chlorinated hydrocarbons, alpha emitters
III  Chlorinated hydrocarbons, beta emitters
IV   Halogenated hydrocarbons, gamma emitters, and alpha emitters
V    Halogenated hydrocarbons, alpha emitters, beta emitters, and gamma emitters
VI   Hydrocarbons, halogenated hydrocarbons, and multiple types radioactive isotopes
VII  Many mixed wastes, alpha emitters, and gamma emitters
VIII Many mixed wastes including polychlorinated biphenyls, dioxins, PCP, battery mud, chrome plating salts, inks, solid rocket fuels, dyes, alpha emitters, beta emitters, and gamma emitters
IX   Mixed halogenated hydrocarbons, beta emitters, and gamma emitters Another preferred reactant alloy according to the invention is tailored for processing waste streams containing relatively high gamma radiation emitting isotopes at 0.72 MeV and higher. This preferred alloy includes about 25% lead (197–207), about 25% tungsten (173–183), and about 50% chemically active metal. The chemically active metal may comprise aluminum and/or magnesium.

As indicated by the example reactant metal alloys shown in Tables 2 and 3 and discussed above, the amount of chemically reactive metal in the alloy preferably always makes up approximately 40% or more of the alloy by weight. This level of chemically active metal in the reactant alloy is helpful in dissolving the metal radioactive constituents in the waste stream. The dissolved radioactive constituents may then be dispersed freely throughout the liquid metal to produce the desired storage alloy.

The radioactive material storage product according to the invention comprises one or more chemically active metals and one or more radioactive isotopes. Also, for each type of expected radioactive emission in the volume of the storage product, the product further includes a corresponding radiation absorbing metal adapted to absorb the respective radioactive emission. The corresponding radiation absorbing metal may be adapted to absorb radioactive emissions from different isotopes, and thus the storage product will not always include a separate radiation absorbing metal for each isotope. Rather, one radiation absorbing metal may be capable of absorbing two or more types (that is, type and energy level) of radioactive emissions in the storage product. In any event, the storage product preferably includes at least about 727 atoms of radiation absorbing metal for each corresponding expected radioactive emission.

In another aspect of the invention, the reactant metal alloy and resulting storage product includes materials specifically suited for absorbing fast neutrons that may be emitted from isotopes in the storage product. Fast neutrons, neutrons emitted at an energy level of ten MeV or greater, may be absorbed by certain materials. These fast neutron absorbing materials transmutate upon absorption of the fast neutron to produce a different isotope. This transmutated material will generally decay with additional radioactive emissions. According to the invention, where the reactant metal alloy will receive fast neutron emitters, such as materials from spent nuclear fuel rods, the reactant alloy will include a transmutation target fraction made up of transmutation target material for absorbing fast neutrons emitted by the fast neutron emitting isotope. The reactant metal alloy will also include a transmutation emission absorbing fraction made up of transmutation emission absorbing material for absorbing emissions resulting from the absorption of a fast neutron by the transmutation target material. These resulting emissions are all emissions occurring after the initial transmutating absorption and may be emissions occurring in several steps.

Transmutation target material and the fraction of such material in the alloy and resulting storage product may include appropriate isotopes of boron, beryllium, lithium, magnesium, aluminum, sodium, zinc, and cadmium. The transmutation emission absorbing fraction in the alloy and resulting storage product may be made up of isotopes of boron, cadmium, and gold.

The transmutation contemplated in the storage product according to the invention follows the following emission steps: Transmutation Target (Target)+fast neutron ($N_F$)=new nucleus+atomic particles of low atomic weight (hydrogen nuclei ($H^2$ or $H^1$), $\alpha$, $\gamma$)+lowered kinetic energy. The transmutation emission absorbing materials (Trans/Ab) then absorb the atomic particles and in turn emit lower energy particles including slow neutrons ($N_S$, less than 10 MeV).

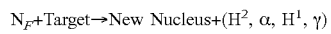
$N_F$+Target→New Nucleus+($H^2$, $\alpha$, $H^1$, $\gamma$)

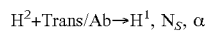
$H^2$+Trans/Ab→$H^1$, $N_S$, $\alpha$

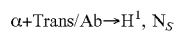
$\alpha$+Trans/Ab→$H^1$, $N_S$

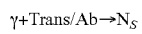
$\gamma$+Trans/Ab→$N_S$

It will be noted that some materials may serve both as transmutation targets and transmutation emission absorbing materials.

In the preferred form of the invention, the transmutation target fraction in the storage product includes no less than approximately three hundred and sixty-five (365) atoms of transmutation target material for each atom of fast neutron emitting isotope in the storage product. Also, the transmutation emission absorbing fraction in the storage product includes no less than approximately three hundred and sixty-five (365) atoms of transmutation emission absorbing material for each atom of fast neutron emitting isotope in the storage product. These relative amounts of transmutation target material and transmutation emission absorbing material provide the preferred coverage around each fast neutron emitting atom in the storage product to increase the likelihood that the fast neutron emission will be absorbed within the primary crystalline matrix within which the fast neutron emitter is contained.

With each reactant metal alloy composition according to the invention, the alloy is heated to a liquid state to prepare the material for receiving the waste stream. Typically, the temperature of the liquid alloy must be maintained at no less than 770 degrees Celsius. in order to provide the desired reaction with organic molecules in the waste material. Higher temperatures for the liquid alloy may also be used within the scope of the invention as discussed above with reference to Table 3. Lower temperatures may also be used where relatively few non-radioactive constituents are included in the waste stream or only relatively light hydrocarbons are included in the waste. In any event, the operating temperature should be a temperature sufficient to place the particular reactant metal alloy in a liquid state and sufficient to allow the radioactive metals in the waste material to dissolve or melt into the bath.

The reactant metal alloy treatment process according to the invention may be used to treat many types of radioactive waste materials and mixed waste streams including both radioactive waste and non-radioactive waste. The treatment process is particularly well adapted for treating wastes which include radioactive constituents mixed with halogenated hydrocarbons. The radioactive isotopes may comprise any isotopes which may be alloyed into the particular liquid reactant metal including, for example, isotopes of plutonium, radium, and rhodium.

Certain radioactive isotopes may not alloy into the liquid reactant metal. Where these isotopes react with metals in the bath to form reaction products which remain in solid or liquid form, these reaction products may be thoroughly mixed with the liquid reactant metal and then cooled while mixed to produce relatively low emission ingots. Any gaseous reaction products which include radioactive isotopes will be entrained with the non-radioactive gaseous reaction products. Some gaseous radioactive isotopes may be absorbed from the reaction product gas. For example, tritium may be absorbed by palladium placed in the stream of gaseous reaction products. However, it is desirable to maintain the operating temperature of the liquid reactant metal low enough to reduce the amount of radioactive isotopes which go into gaseous reaction products. For example, where a radioactive isotope of iodine is included in the waste stream, the chemically active metal in the alloy may include aluminum and the operating temperature is maintained low enough to ensure that the resulting aluminum iodide remains primarily in a liquid state.

The aluminum, magnesium, or lithium in the reactant alloy according to the invention strips halogens from the halogenated hydrocarbons in the waste stream to produce halogen salts. Other elements in the non-radioactive waste material, such as phosphorous, sulphur, and nitrogen, are also stripped from the carbon atoms in the waste material. Much of this other stripped material forms metal salts (sulfates, nitrates, phosphates) which separate from the liquid reactant metal by their respective density. Where these separated materials include only non-radioactive constituents they may be separately drawn or scraped from the liquid reactant metal by any suitable means. Most of the halogen salts and char go to a gaseous state and are drawn off for separation and recovery. Any low boiling point metals, such as arsenic or mercury, for example, which are liberated from the waste materials are also drawn off in a gaseous state for recovery. Non-radioactive, relatively high boiling point metals such as chromium, and radioactive metals in the waste material remain safely in the liquid alloy. The original metals which make up the alloy remain in the liquid alloy unless consumed in the formation of salts and small quantities of oxides.

The treatment process according to the invention is illustrated in FIG. 1. The waste material to be treated is first analyzed to identify the types and concentrations of non-radioactive chemicals and radioactive isotopes present in the waste. This analysis step is shown at box 101 in FIG. 1. Information regarding the types and concentrations of non-radioactive constituents in the waste material is used to help choose the types of chemically active metals to be included in the liquid reactant alloy. Information regarding the radioactive isotopes in the waste material determines the amount and type of radiation absorbing metals to be included in the liquid reactant alloy.

The types and concentrations of radioactive isotopes and non-radioactive chemicals in the waste material are preferably determined using an analytical technique such as mass spectroscopy at step 101. Of course, any analytical technique will be limited to certain minimum detection levels below which an isotope or chemical cannot be detected. The concentration of radioactive isotopes detected in the waste stream is then used at step 103 to produce an estimate of the quantity or amount of each radioactive isotope present in the waste per unit volume or weight.

Once the amount and type of non-radioactive constituents and radioactive isotopes in the waste material are known, the reactant metal alloy for treating a selected volume or weight of the particular waste material is constructed at step 104. Specifically, a reactant metal alloy is built with chemically active metals for reacting with the non-radioactive constituents in the waste material and with sufficient radiation absorbing metals to produce the desired storage product.

With the reactant alloy built for the particular waste and held in a liquid state at the desired operating temperature, the process includes metering the waste material into the liquid reactant metal at step 105. Any suitable metering device may be used to perform the metering step according to the invention. Preferably, the metering device provides a continuous output of volumetric information (or weight information if it is desired to meter the waste stream by weight). Since the amount of waste material which may be added to the liquid reactant alloy to produce the desired storage product (desired minimum ratio) is known, waste material may be metered into the reactant alloy until that known amount is reached. Alternatively, the continuous output showing the cumulative amount of waste added to the reactant alloy may be used at step 106 to calculate the total radioactive isotopes in the alloy and the ratio of radiation absorbing atoms to corresponding expected radioactive emissions at step 106. This calculation step also requires the radioactive isotope concentration or amount information from step 103 and the alloy information from step 104. The calculation may be performed using a suitable processor (not shown) connected to receive the required inputs, or may be performed manually. The calculated ratio or the cumulative amount may be compared to a corresponding set value at step 107 to provide a control signal which may be used to automatically stop the introduction of waste material into the reactant alloy.

The metered amount of waste material is added to the liquid reactant metal at step 108 in FIG. 1. Also, the preferred form of the invention includes a separate emission monitoring step to monitor radioactive emissions from the waste material stream as it is being directed to the liquid reactant alloy. This separate monitoring step, 108 in FIG. 1, may be performed using any suitable radioactive emission detector to detect anomalous high concentrations of radioactive isotopes. Suitable devices include gas-filled, scintillation, or semiconductor type detectors. Regardless of the detector type, an unexpected spike in radioactive emissions may be used at decision box 109 to produce a control signal to stop the waste stream from being introduced into the reactant alloy. This control signal may be automated or may be made manually by an operator overseeing the treatment process.

In the preferred treatment process according to the invention, the reactant metal alloy composition is contained in a reactant alloy container such that the alloy is substantially isolated from oxygen. The reactant alloy is then heated by a suitable heating arrangement to the desired operating temperature, which is generally greater than 770 degrees Celsius. as discussed above. Any remaining oxygen in the reactor vessel quickly reacts with the metal in the alloy to produce metal oxides which appear as dross at the surface of the liquid material or sink to the bottom of the reactant alloy container. In the preferred process, a layer of pure carbon in the form of graphite is placed at the surface of the liquid reactant metal alloy. The graphite layer may be from approximately one-quarter inch to several inches thick and helps further isolate the liquid alloy from any oxygen which may be in the reactant alloy container.

Once the liquid alloy reaches the desired operating temperature, the waste material is introduced into the reactant liquid alloy to perform the contacting step shown in FIG. 1. The waste material is preferably introduced below the surface of the liquid alloy but may be introduced at the surface of the alloy within the scope of the invention. The temperature of the metal alloy is maintained at least at the desired operating temperature as waste material is added to the liquid alloy. Heat will commonly need to be added continuously by the heating arrangement in order to maintain the desired operating temperature. Also, it will be appreciated that pockets of relatively cooler areas may form momentarily in the reactant alloy as waste material is added. The bulk of the reactant alloy, however, is maintained at least at the desired operating temperature. A suitable mixing arrangement may be used with the reactant alloy container to ensure that the relatively cool waste material is distributed quickly within the reactant alloy and to ensure that the radioactive isotopes and radiation absorbing metals are evenly distributed within the alloy. A mechanical stirring device (not shown) to continuously stir the liquid material provides a suitable mixing arrangement.

Once the desired minimum level of radiation absorbing metal to corresponding expected radioactive emissions is reached for a given volume of reactant alloy according to the invention, the waste stream is halted and the reactant alloy cooled to form one or more solid ingots of the storage material. Where isotopes of cadmium are to be included in the storage product, it is necessary to cool the liquid metal to a temperature low enough to allow the cadmium to go to a liquid form (725 to 765 degrees Celsius.). Thereafter, the liquid material may be thoroughly mixed prior to further cooling. The resulting solid ingots each include unreacted alkaline metals, the radiation absorbing metals, and the radioactive isotopes from the waste stream, all substantially evenly distributed. Each ingot is preferably encapsulated with a radiation absorbing encapsulant material for storage. The encapsulant material preferably includes a material or combination of materials which together are capable of absorbing each type of radioactive emission expected from the resulting ingot. Also, the encapsulant material preferably includes a close packed crystal forming metal such as tungsten to produce a desirable crystalline structure in the encapsulant material which holds the emission absorbing metals closely and thereby increase the likelihood that a given emission from the storage product will be absorbed in the encapsulant material and will not penetrate the encapsulant material. The preferred tungsten concentration in the encapsulant material is one tungsten atom for each 27 other atoms in the encapsulant material.

Figure 2:
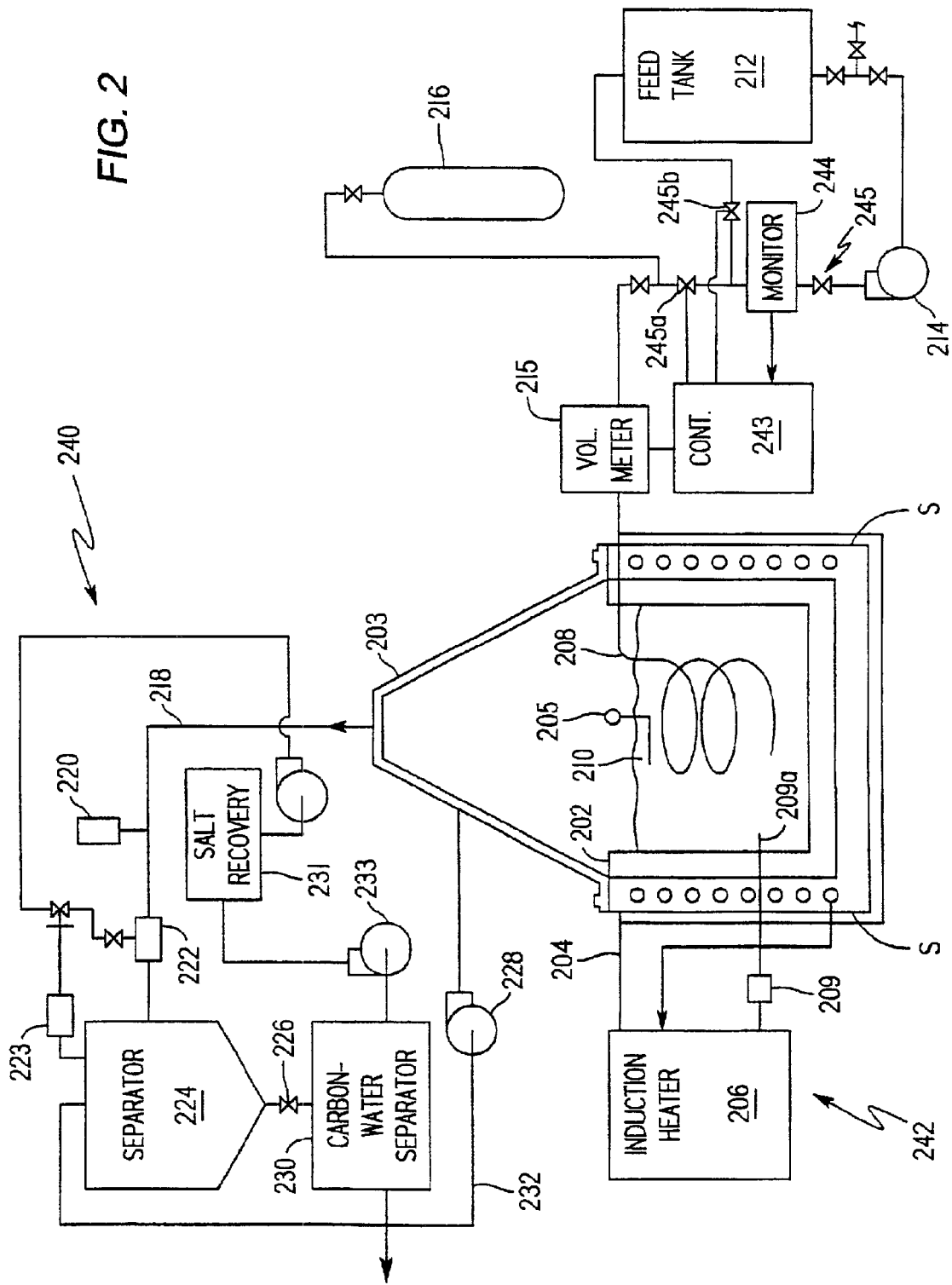
FIG. 2 is a diagrammatic representation of an apparatus for performing the treatment process shown in FIG. 1.
Figure 2:
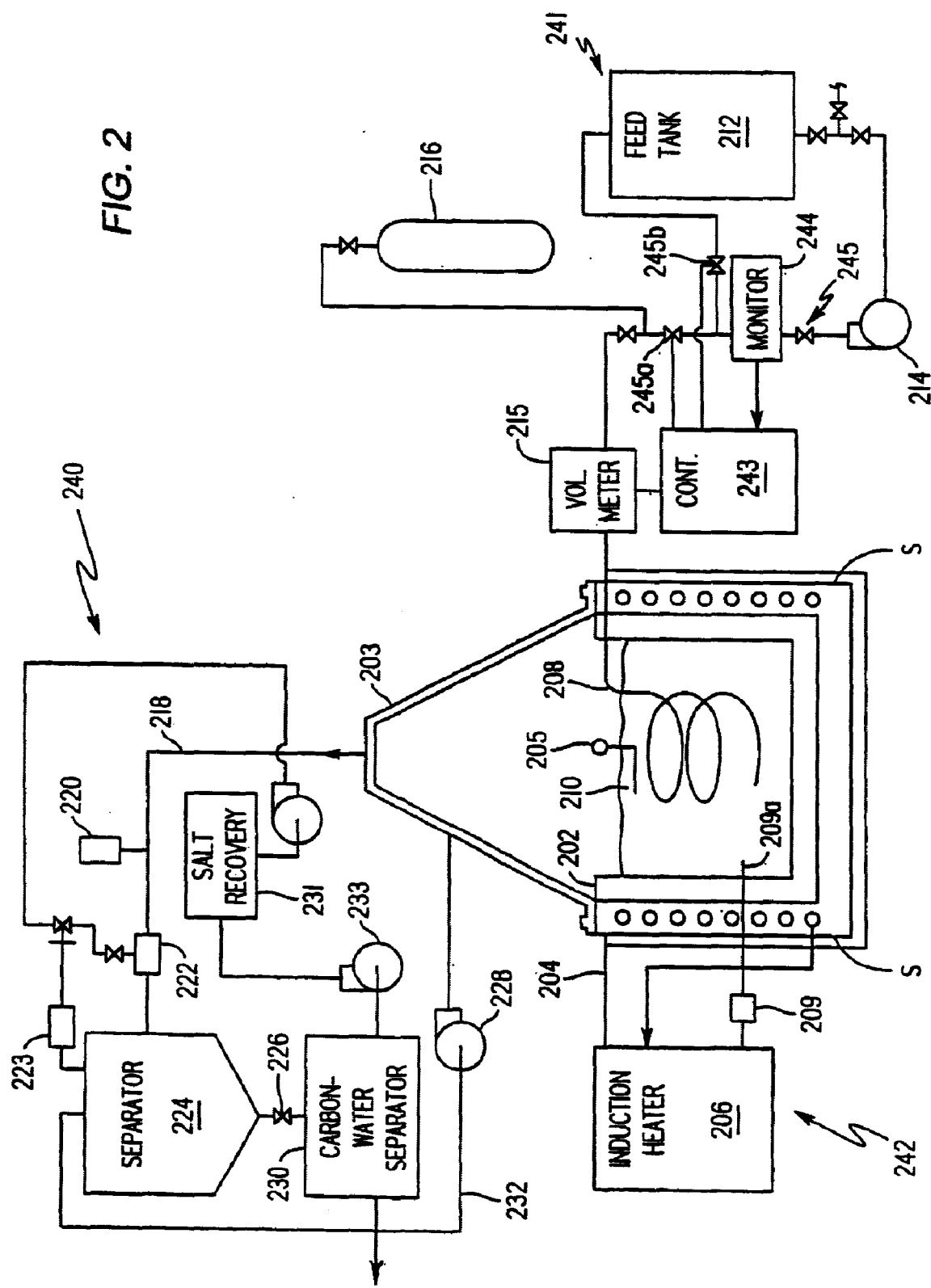

FIG. 2 shows an apparatus for performing a treatment process embodying the principles of the invention. The apparatus includes a reactant alloy container 202, a recovery/recirculation arrangement 240, a feed arrangement 241, and a heating arrangement 242. The reactant alloy container 202 is preferably built from a suitable metal which will maintain structural integrity at the desired elevated temperatures. However, due to the highly reactive nature of the alloy 210, the reactant alloy container 202 is lined with a ceramic or other suitable refractory material to prevent the metal of the container from reacting with the reactant alloy. Also, due to the radioactive material to be alloyed in the process, container 202 also preferably includes a layer S of suitable radiation absorbing shielding. This shielding is adapted to block or absorb each type of radioactive emission which may emanate from the interior of container 202. A cover 203 is connected over container 202 for collecting gaseous reaction products and helping to isolate the metal bath from oxygen. Although not shown in the drawing, radiation shielding material is also preferably included in cover 203 and with the feed arrangement 241.

An expendable hook 205 may be placed in the alloy 210 at the termination of the process and, after cooling, may be used to lift the solidified alloy ingot from the reactant alloy container 202. Alternatively, a suitable drain may be included in container 202 for draining off reactant alloy once the desired minimum ratio of radiation absorbing atoms to corresponding radioactive emissions is reached.

Solids may be mixed with liquids to form a slurry and the slurry introduced similarly to liquid wastes as discussed below. Also, solids either alone or in the form of a slurry may be introduced into the container 202 through an auger arrangement or other suitable arrangement such as that shown in U.S. Pat. No. 5,431,113, the disclosure of which is hereby incorporated herein by this reference.

The heating arrangement 242 includes an induction heater, including an induction heater power supply 206 and induction coils 204 built into the reactant alloy container 202. The coils 204 may be water-cooled and the water may be used to cool the reactant alloy 210 as desired, either during the treatment process or at the completion of the treatment process. The induction heater arrangement 242 includes a heater control 209 with a suitable sensor 209a inside the reactant alloy container 202 for controlling the induction heater and maintaining the temperature of the metal alloy 210 at the desired operating temperature. Although the induction heating arrangement is illustrated in FIG. 1, any suitable heating arrangement, including a fossil fuel burning heater may be used to heat the alloy 210 to the desired temperature. U.S. Pat. No. 5,452,671 to the present inventor illustrates a fossil fuel fired heating arrangement which may be used according to the present invention. The disclosure of U.S. Pat. No. 5,452,671 is hereby incorporated herein by this reference.

The feed arrangement 241 includes feed tank 212 and feed coil 208. Feed tank 212 contains waste material to be processed. A feed pump 214 pumps the waste material from feed tank 212 to the reactant alloy container 202 through a metering device 215. Metering device 215 serves two functions. First, metering device 215 is operated to meter waste material into the reactant alloy at a rate which does not exceed the capacity of the heater arrangement 242 to maintain the desired operating temperature in the liquid reactant metal 210. Second, metering device 215 provides information regarding the amount of waste material added to the liquid reactant metal. This quantity information may be used to calculate the ratio of radiation absorbing atoms in the alloy 210 to the atoms of corresponding expected radioactive emissions. As described above with reference to FIG. 1, the ratio calculations are preferably computed automatically and continuously in a suitable control processor shown at reference number 243 in FIG. 2. Control processor 243 also receives information concerning the radiation absorbing metals in container 202 and information concerning the concentration (or amount) of various radioactive isotopes in the waste material to be treated. Alternatively to calculating the ratio as waste material is being added to the liquid metal bath, the quantity information used to build the liquid reactant alloy can be used to limit the amount of waste material metered through metering device 215.

Feed system 241 also preferably includes a radioactive emission monitoring device 244 connected in position to monitor the stream of waste material being directed to the liquid metal 210 for treatment. Monitoring device 244 may be located in a recirculation manifold shown generally at 245. Should monitoring device 244 detect a spike in radioactive emissions from the waste stream, controller 243 (or an operator) may close valve 245a and open valve 245b to circulate the waste stream back to feed tank 212. Alternatively to the manifold arrangement, the feed pump 214 can simply be turned off to halt the flow of waste material into the reactant alloy 210.

Feed coil 208 is coated on its interior and exterior surfaces or formed from a ceramic or other suitable refractory material to prevent the coil from reacting with the liquid alloy 210 in container 202. The outlet end of the coil is preferably positioned well below the surface of the alloy 210 to ensure good contact between the waste material and liquid reactant metal 202. The feed system 241 also preferably includes a gas purging arrangement including a gas storage cylinder 216 for containing a suitable purge gas such as nitrogen. The gas purging arrangement is operated to purge the feed lines and coil 208 of air prior to operation of the system. Gases other than nitrogen may be used to purge the system of oxygen, including flue gases from a fossil fuel burning heater arrangement.

The recovery/recirculation system 240 includes an aqueous scrubber/separator 224, a char/water separator 230, a salt recovery arrangement 231, and a recirculation arrangement 232. Off-gas from the area above the liquid alloy 210 in container 202 comprising gaseous halogen salts, char, and other gases are drawn off through line 218. Line 218 is preferably made of stainless steel and includes a relief valve 220 to maintain atmospheric pressure on line 218. A water spray nozzle 222 is associated with the scrubber/separator 224 and serves to spray water into the off-gas at the inlet to the scrubber/cyclone separator. The water sprayed into the off-gas causes the char to coalesce while the salt in the off-gas goes into solution in the water. The amount of water supplied through nozzle 222 is preferably controlled with temperature controller 223 to maintain the temperature below about 100 degrees Celsius. in the scrubber/separator 224. A char slurry forms in the bottom of the scrubber/separator 224 and is drawn off through valve 226. The slurry comprises char and water with salt in solution. The char slurry is directed to char/water separator 230 which separates out the fine char particles from the water solution and passes the water solution through pump 233 on to salt recovery system 231. Salt recovery system 231 may comprise an evaporative system. Water from salt recovery system 231 may be recycled to nozzle 222. Any gas from separator/scrubber 224 may be vented to the atmosphere through a suitable radiation monitoring arrangement (not shown). Alternatively, gas from separator/scrubber 224 may be drawn off through recirculation fan 228 and reintroduced to the area above the liquid alloy 210 for recycling through the system.

It will be appreciated that a reactant metal alloy according to the invention may be used in other types of apparatus to produce the desired storage product. The invention is not limited to the illustrated apparatus. For example, an apparatus such as that shown in U.S. patent Ser. No. 10/014,976, entitled "MOLTEN METAL REACTOR UTILIZING MOLTEN METAL FLOW FOR FEED MATERIAL AND REACTION PRODUCT ENTRAPMENT" may be used with an alloy according to the invention to produce the desired storage product. The entire content of this application to the present invention is incorporated herein by this reference.

EXAMPLE I

A waste material is analyzed with a mass spectrometer and found to comprise thorium 229 at 9 parts per million (ppm), PCBs at 500 ppm, and creosote at 1000 ppm in water. To treat one ton of the waste material, a liquid reactant metal according to the invention may include predominantly aluminum and perhaps small percentages of zinc, iron, copper, and calcium. The primary emissions of thorium 229 include alpha particles at 5.168 MeV. Beryllium 11 is added to the liquid reactant metal as a corresponding absorber for the alpha emissions and lead 206 is added to absorb the primary gamma emissions from the thorium 229 and secondary gamma emissions as the alpha particles interact with materials in the bath. The 9 ppm of thorium 229 equates to 6.412 grams of the isotope per ton of the waste material. 6.42 kilograms of beryllium 11 is included in the metal bath to provide a one thousand to one correspondence between the beryllium and the expected alpha emissions. 12.84 kilograms of lead 206 is included in the metal bath to provide a one thousand to one correspondence between the lead and the expected primary and secondary gamma emissions.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the invention is described above with the reactant alloy being heated to a liquid state in the reactant alloy container, the alloy constituents may be heated to a liquid state together or individually outside the reactant alloy container and added to the container as a liquid material. Heating the reactant alloy metals outside of the reactant alloy container is to be considered an equivalent to the embodiment in which the metals are initially heated to the liquid state within the reactant alloy container. Furthermore, constituents of the desired reactant metal alloy may be added while the waste material is being added. Adjusting the reactant alloy of the bath after some waste material has been added is to be considered equivalent to adding the waste material to a completely pre-built reactant metal bath. Also, numerous solid and liquid recovery arrangements may be used within the scope of the invention instead of the example arrangement 240 shown in FIG. 2 and the arrangement shown in application Ser. No. 10/014,976.

What is claimed is:

1. A storage product for storing radioactive isotopes, the storage product including:
  (a) at least one radioactive isotope;
  (b) a metal alloy including a chemically active metal fraction in an amount effective for chemically reducing organic feed materials, tungsten in an amount effective for producing a close-packed crystalline structure throughout the metal alloy upon solidification of the metal alloy from a molten state, and for each type of expected radioactive emission associated with a radioactive isotope in the storage product, at least one corresponding radiation absorbing metal, each corresponding radiation absorbing metal being capable of absorbing the respective type of expected radioactive emission; and
  (c) wherein the metal alloy is solidified from the molten state to form a storage ingot with each radioactive isotope, the tungsten, the chemically active metal fraction, and each radiation absorbing metal being substantially evenly distributed within the ingot.

2. The storage product of claim 1 including a radiation absorbing encapsulant encapsulating the ingot, the encapsulant material including at least one radiation absorbing material for each type of expected radioactive emission within the ingot and further including tungsten in an amount effective for producing a close-packed crystalline structure in the encapsulant.

3. The storage product of claim 1 including no less than approximately one atom of tungsten for every twenty-seven atoms of other elements in the storage product.

4. The storage product of claim 1 wherein each chemically active metal in the chemically active metal fraction is selected from the group consisting of magnesium, aluminum, lithium, zinc, calcium, and copper.

5. The storage product of claim 1 wherein the cumulative total amount of die chemically active metal fraction is no less than approximately forty percent by weight of the total metal alloy.

6. A storage product for storing a fast neutron emitting isotope, the storage product including:
  (a) a metal alloy including a chemically active metal fraction in an amount effective for chemically reducing organic feed materials, the metal alloy also encompassing a quantity of a fast neutron emitting isotope;
  (b) a transmutation target fraction forming part of the metal alloy, the transmutation target fraction made up of a transmutation target material for absorbing fast neutrons emitted by the fast neutron emitting isotope;
  (c) a transmutation emission absorbing fraction forming part of the metal alloy, the transmutation emission absorbing fraction made up of a transmutation emission absorbing material for absorbing emissions resulting from the absorption of a respective fast neutron by the transmutation target material; and (d) tungsten in an amount effective for producing a close-packed crystalline structure upon solidification of the metal alloy; and (e) wherein the metal alloy is solidified from a molten state to form a storage ingot with the fast neutron emitting isotope, the chemically active metal fraction, the transmutation target fraction, and the transmutation emission absorbing fraction being substantially evenly distributed within the ingot.

7. The storage product of claim 6 including no less than approximately one atom of tungsten for every 27 atoms of other elements in the storage product.

8. A storage product for storing radioactive isotopes including:

(a) at least one radioactive isotope tungsten in an amount effective for producing a close-packed crystalline structure throughout the storage product upon solidification of the storage product from a molten state, and for each type of expected radioactive emission in the storage product, no less than approximately seven hundred and twenty-seven (727) atoms of a corresponding radiation absorbing metal, each corresponding radiation absorbing metal capable of absorbing the respective type of expected radioactive emission in the storage product;

(b) a chemically active metal fraction in an amount effective for chemically reducing organic feed material; and (c) wherein the storage product is solidified from the molten slate to form a storage ingot with each radioactive isotope, the tungsten, the chemically active metal fraction, and each radiation absorbing metal being substantially evenly distributed within the ingot.

9. The storage product of claim 8 including no less than approximately one atom of tungsten for every 27 atoms of other elements in the storage product.

* * * * *

UNITED STATES PATENT AND TRADEMARK OFFICE
CERTIFICATE OF CORRECTION

| | | |
|---|---|---|
| PATENT NO. | : 7,034,197 B2 | Page 1 of 2 |
| APPLICATION NO. | : 10/059808 | |
| DATED | : April 25, 2006 | |
| INVENTOR(S) | : Anthony S. Wagner | |

It is certified that error appears in the above-identified patent and that said Letters Patent is hereby corrected as shown below:

The sheet of drawing consisting of figure 2 should be deleted to appear as per attached sheet.

At column 16, line 53:
 Change "die" to --the--.

At column 17, line 4:
 Delete "and".

Signed and Sealed this

Seventeenth Day of October, 2006

JON W. DUDAS
*Director of the United States Patent and Trademark Office*